United States Patent [19]

Rosenthal

[11] Patent Number: 5,392,342
[45] Date of Patent: Feb. 21, 1995

[54] TECHNIQUE FOR USE IN SEQUENTIALLY ROUTING PERSONAL TELEPHONE CALLS

[75] Inventor: Eugene J. Rosenthal, Highland Park, N.J.

[73] Assignee: AT&T Corp., Murray Hill, N.J.

[21] Appl. No.: 144,062

[22] Filed: Oct. 27, 1993

[51] Int. Cl.⁶ ............................................. H04M 3/46
[52] U.S. Cl. ................................... 379/211; 379/215; 379/207; 379/201; 379/210
[58] Field of Search ............... 379/196, 197, 198, 201, 379/211, 212, 213, 214, 142, 246, 210, 215, 157

[56] References Cited

U.S. PATENT DOCUMENTS

| | | | |
|---|---|---|---|
| 3,626,109 | 12/1971 | Bartlett | 379/211 X |
| 5,018,194 | 5/1991 | Suzuki et al. | 379/207 |
| 5,251,248 | 10/1993 | Tokunaga | 379/220 X |
| 5,276,731 | 1/1994 | Arbel et al. | 379/142 |
| 5,337,351 | 8/1994 | Manabe et al. | 379/215 |

FOREIGN PATENT DOCUMENTS

| | | | |
|---|---|---|---|
| 498593 | 8/1992 | European Pat. Off. | 379/211 |
| 3007584 | 9/1981 | Germany | 379/211 |
| 54-116809 | 11/1979 | Japan . | |
| 61-70847 | 4/1986 | Japan | 379/211 |
| 62-230250 | 10/1987 | Japan | 379/211 |

OTHER PUBLICATIONS

Wakahara et al., "A Method for Detecting Service Interactions", Aug. 1993, IEEE Communications Magazine, pp. 32–37.

Primary Examiner—James L. Dwyer
Assistant Examiner—Daniel S. Hunter
Attorney, Agent, or Firm—Eugene J. Rosenthal

[57] ABSTRACT

In a personal communication service (PCS) environment, where a call to a personal telephone number may be routed to a sequence of telephone numbers until the call is answered or abandoned, and where it is possible that the telephone number of the caller is one of the numbers in the sequence, the call to the personal telephone number is processed by a) determining if the automatic numbering identification (ANI), i.e., the telephone number, of the calling telephone is the same as a telephone number of the sequence, and, if so, b) skipping over that telephone number, i.e., the caller's telephone number, so that no attempt is made to complete a PCS call to the calling telephone.

15 Claims, 2 Drawing Sheets

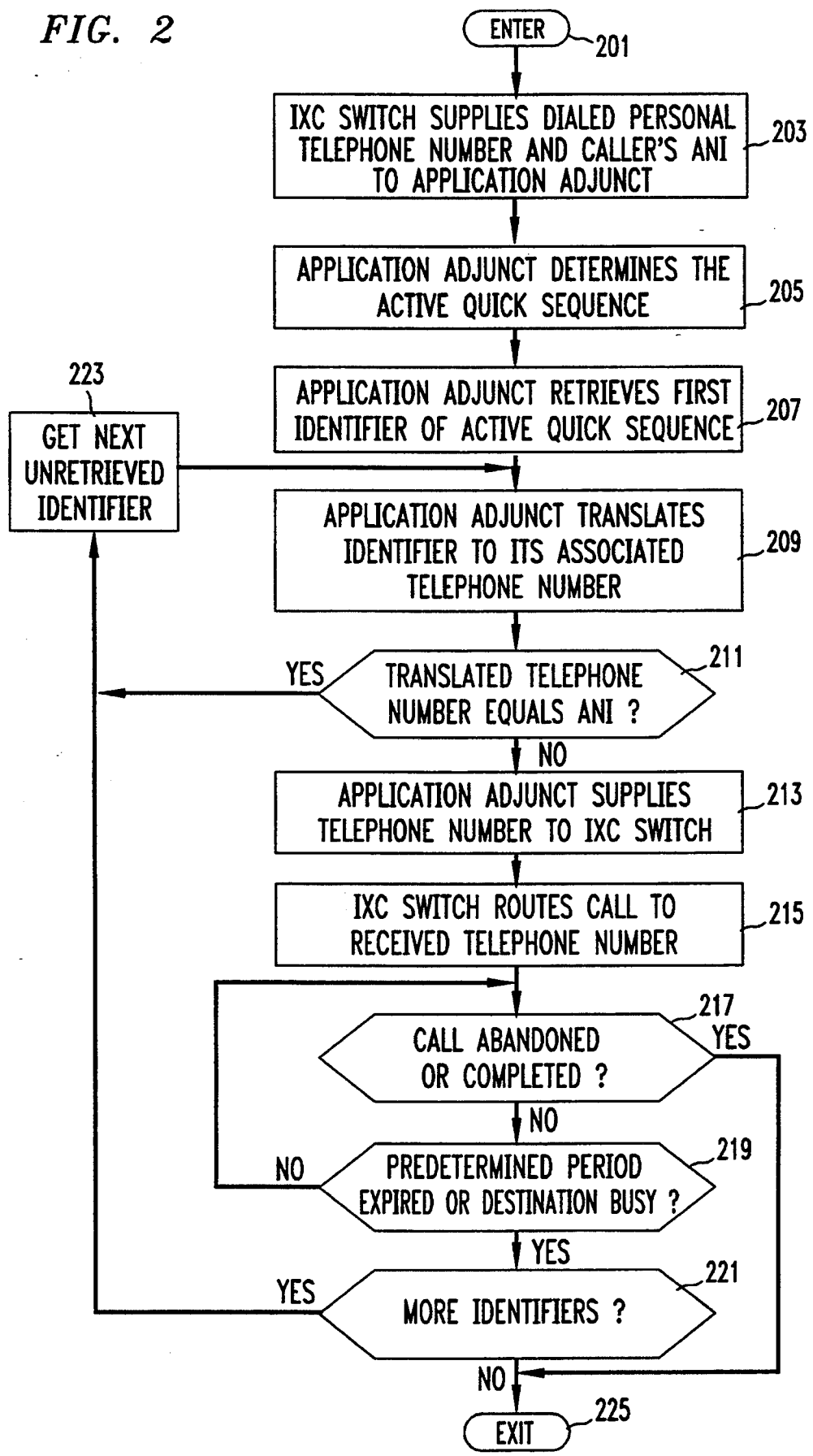

TECHNIQUE FOR USE IN SEQUENTIALLY ROUTING PERSONAL TELEPHONE CALLS

TECHNICAL FIELD

This invention relates to personal communications, and more particularly, to the processing of a telephone call to a person's personal telephone number.

BACKGROUND OF THE INVENTION

Personal communication service (PCS) is a service in which subscribers, rather than locations or telephone stations, are assigned a personal telephone number. Calls placed to a subscriber's personal telephone number are routed to the subscriber at a telephone near that subscriber's current location. In order to provide a subscriber with such a personal communication service, e.g., as disclosed in U.S. Pat. No. 4,313,035, issued to Jordan, et al., the system providing the service (PCS system) must be supplied with the telephone number of a telephone near the subscriber's current location to which it should route calls placed to his personal telephone number. Each time the subscriber changes his location, the telephone number to which calls placed to his personal telephone number are routed must be changed. This requires the subscriber to call into the PCS system and to supply the telephone number to which his calls should currently be routed. Constantly having to call in to the PCS system can be tiresome, and supplying a ten-digit telephone number each time a subscriber changes his location is cumbersome.

To overcome these drawbacks, one prior art solution is to program a sequence of telephone numbers at any one of which the personal telephone service subscriber might be reached. The telephone numbers in a sequence are typically those of locations where a person is likely to be at various times thought the day, such as "home", "car phone", "office", "pager", etc. When a call is made to the subscriber's personal telephone number, the PCS system attempts to complete the call by sequentially routing the call to each telephone number in the sequence. Each attempt to complete the call to a telephone number of the sequence continues until a) the call is answered, b) the call is abandoned, c) the line associated with the telephone number is determined to be busy or d) until a predetermined period of time has elapsed.

Occasionally, a caller may place a call to the subscriber's personal telephone number from a telephone whose number is part of the sequence to be tried for the subscriber's personal telephone number. This situation might occur when a wife, calling from home, dials her husband's personal telephone number, which is programmed to attempt to reach him first at his office, then at home on the same telephone line on which his wife is calling, and finally, at his mobile telephone in his car. Assuming the husband has left work and is in his car, and further assuming that nobody answers the call at the office, an attempt will be made to route call to the home telephone on which the wife is calling before it is routed to the mobile telephone in the car. Attempting to route a PCS call back to the calling telephone wastes system resources by consuming unnecessary processing time, and may result in an unnecessary expense to the carrier of the PCS call if an access charge is incurred. For such a call, the call flow is also affected if the calling telephone line is provisioned with the well known call waiting feature. This is because, at the point in the sequence that the PCS system attempts to complete the call to the telephone number of the calling telephone, the call waiting feature is activated by the caller's own call to the personal telephone number, thereby causing the caller to hear the call waiting tone. Such a call waiting tone is actually erroneous, since there is no actual other call, i.e., no call other than the call being placed by the caller himself, that is attempted to be completed to the calling telephone. Thus, if the home telephone in the above-described example is provisioned with call waiting, the wife will hear the erroneous call waiting tone. The erroneous call waiting tone will persist until the wife attempts to answer the apparent second call or until the predetermined time for attempting to complete the call to the home telephone number expires.

Such an erroneous call waiting tone is problematic. Firstly, the caller is put to an unnecessary choice, because he must choose whether to continue on the call he placed to the personal telephone number or whether to interrupt that call and answer what appears to him as a second call that is arriving at his telephone line. Since no actual second call is arriving at the caller's telephone line, but instead the there is only the illusion of a second call caused by the erroneous call waiting tone, there is actually no need for the caller to have to make such a choice. Secondly, the caller may become confused as a result of the erroneous call waiting tone because, if he answers the "illusory" second call represented to him by the call waiting tone, he will not actually answer a call but instead will be connected back to his own telephone line—which is on hold for call waiting purposes. Furthermore, should the caller then signal the call waiting feature to return him to his outgoing call, he will find that the PCS system is no longer attempting to connect his call to any further telephone numbers and, instead, has gone dead.

SUMMARY OF THE INVENTION

I have realized that in a PCS environment, where it is possible that the telephone from which a caller originates a call is specified as one of the sequence of destinations to which the PCS system will attempt to route a particular PCS call, the aforementioned difficulties can be avoided by, in accordance with the principles of the invention, a) determining if the originating station identification information, e.g., the telephone number, of the calling telephone from which the PCS call is originated, is the same as a destination, e.g., telephone number, in the sequence of destinations to which the PCS call is to be routed to, and, if so, b) skipping over that destination, e.g., the caller's telephone number, so that no attempt is made to complete a PCS call to the calling telephone. In an exemplary embodiment of the invention, the originating station identification information is obtained using automatic numbering identification (ANI).

BRIEF DESCRIPTION OF THE DRAWING

In the drawing:

FIG. 2 shows a flowchart of an exemplary process for providing personal telecommunication services in accordance with the principles of the invention.

DETAILED DESCRIPTION

Figure 1:
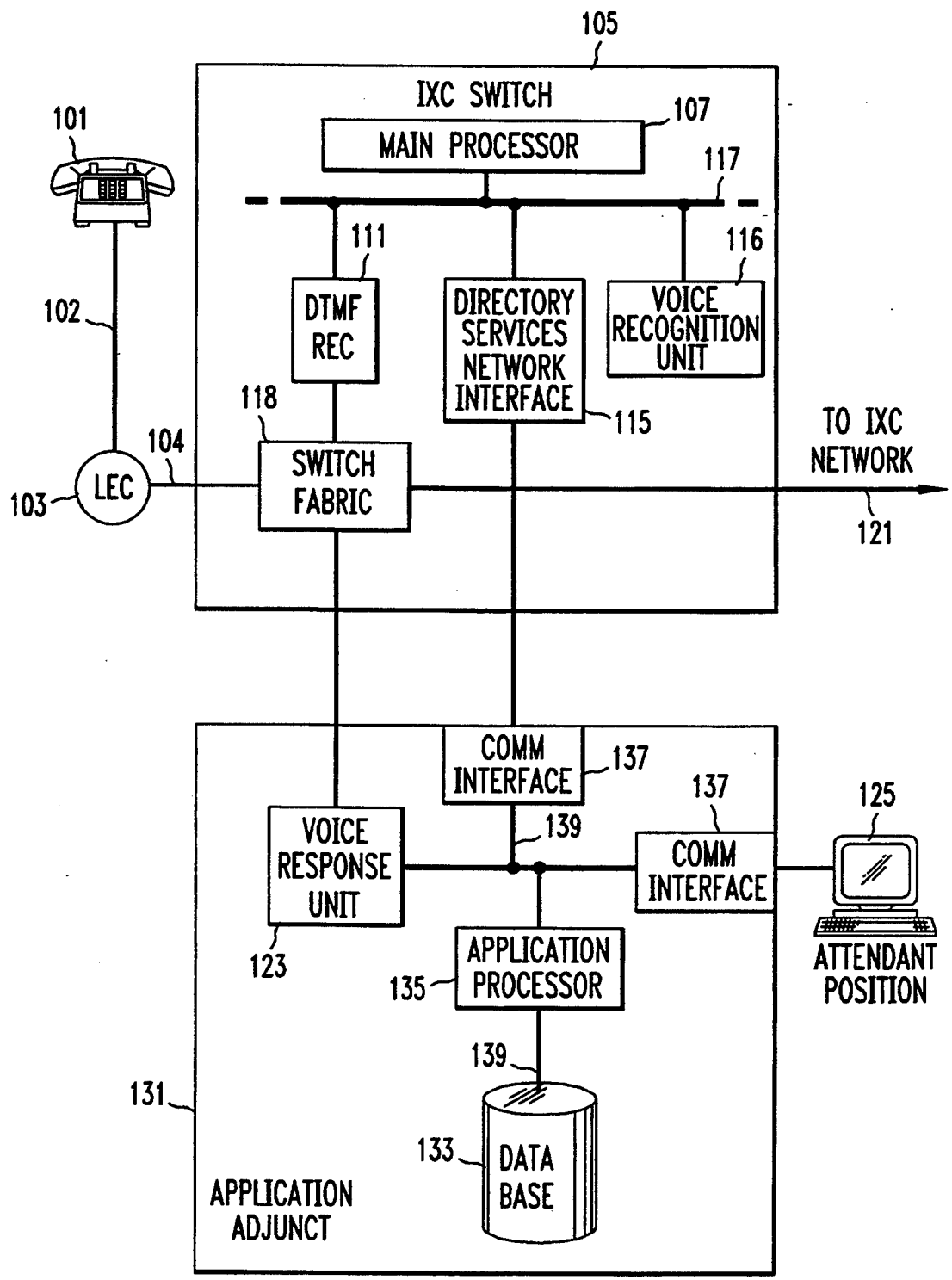
FIG. 1 shows an exemplary embodiment of a system for providing personal communications services in accordance with the principles of the invention.

FIG. 2 shows a flowchart of an exemplary method for processing PCS calls in accordance with the principles of the invention when the telephone number of a caller can be one of the telephone numbers of the sequence to which a particular PCS call may be routed. In particular, the PCS system a) determines if the automatic numbering identification (ANI), i.e., the telephone number, of the calling telephone is the same as a telephone number in the sequence and, if so, b) it skips over that telephone number, i.e., the caller's telephone number, so that it does not attempt to complete the PCS call to the caller's telephone. Thus, the PCS system disregards any telephone numbers in the sequence that are the same as the caller's telephone number.

However, to understand FIG. 2 it is necessary to understand the operation of a PCS system. Therefore, attention is first directed to FIG. 1, which shows an exemplary embodiment of a PCS system in accordance with the principles of the invention. Shown are a) telephone station 101, from which calls to a personal telephone number may be originated or received, b) telephone line 102 of telephone station 101, which is provisioned with the well known call waiting feature, c) local exchange carrier (LEC) 103, d) IXC switch 105, e) application adjunct 131, and f) attendant position 125.

Application adjunct 131 performs the necessary processing for 1) storing an association between a) a telephone number, b) a pre-defined, mnemonic tag, and c) a corresponding identifier; 2) developing and storing sequences of telephone numbers for PCS calls, which are referred to herein as "quick sequences"; and 3) supplying the telephone numbers of destinations to which IXC switch 105 should route a call placed to a subscriber's personal telephone number, in accordance with the principles of the invention. Application adjunct 131 includes: a) application processor 135, b) data base 133, c) voice response unit 123, and d) communication interfaces 137. Application processor 135 controls the overall operation of application adjunct 131 by performing any necessary processing and exchanging messages with the other components of application adjunct 131 over links 139. Links 139 convey information in digital form and need not all be of the same type or speed, e.g., one may be an ethernet link while the others are RS-232C links. Data base 133 stores the information required by application processor 135 to control application adjunct 131, e.g., program code and data.

Voice response unit 123 can make various announcements which can be heard by the calling party. The information necessary for making the announcement announcements, or combinative portions thereof, may be prestored in voice response unit 123. Such combinative portions may include caller instruction messages, e.g., "Please wait, we are attempting to reach your party." In one embodiment, the announcements are accessed by supplying voice response unit 123 with pointers to them. Voice response unit 123 is connected to switch fabric 118 so that the announcements may be routed to subscribers connected to application adjunct 131.

Communication interfaces 137 translate information for communication between application adjunct 131 and devices external to application adjunct 131. Communication interfaces 137 need not be the same. Attendant position 125, staffed by a human attendant, interfaces with application adjunct 131 to handle any questions that a subscriber may have or any problems that may arise.

IXC switch 105 includes: a) main processor 107, b) dual tone multifrequency receiver (DTMF REC) 111, c) directory services network interface 115, d) bus 117, e) switch fabric 118, and f) optional voice recognition unit 116. Main processor 107 controls the overall operation of IXC switch 105 by performing any necessary processing and exchanging messages with the other components of IXC switch 105 over bus 117. Dual tone multi-frequency receiver (DTMF REC) 111 receives dual tone multi-frequency signals that are transmitted in response to the pressing of keys on the keypad of telephone station 101 and supplies the digit corresponding to each pressed key to main processor 107. IXC switch 105 receives the caller's ANI from LEC 103 in the conventional manner.

Directory services network interface 115 is a protocol conversion unit that permits IXC switch 105 to communicate with application adjunct 131. It is responsible for formatting all messages transmitted to and for extracting responses received from application adjunct 131. Such messages include a) a message from IXC switch 105 indicating the ANI of the calling telephone and b) a message from application adjunct 131 indicating which destination telephone number the PCS call should presently be routed to. In one embodiment, the link between directory services network interface 115 and application adjunct 131 uses the well known X.25 protocol.

Switch fabric 118 can connect the trunk on which the subscriber's call arrived at IXC switch 105, e.g., trunk 104, to a) dual tone multi-frequency receiver (DTMF REC) 111, b) voice recognition unit 116, c) voice response unit 123 or d) to the rest of the interexchange carrier's network, via link 121. Some of the purposes of such connections are described further below.

In one embodiment of the invention, for ease of use and administration, each telephone number to which PCS calls can be routed is stored in association with a pre-defined, mnemonic tag and a corresponding identifier. Table 1 shows an exemplary list of such tags and their corresponding identifiers. In this embodiment, Table 1 is stored in data base 133. Table 1 may be implemented as an array in which the tags are the elements of the array and the identifiers are the corresponding indices into the array. Text-to-speech conversion may be used to speak the tags or, alternatively, there may also be stored pointers to information representing stored speech for each tag. The information representing speech may be stored in voice response unit 123, as noted.

TABLE 1

| Tag | Identifier |
|---|---|
| Home | 01 |
| Office | 02 |
| Secretary | 03 |
| Car Phone | 04 |
| Wife | 05 |
| Husband | 06 |
| AT&T Voice Mail | 07 |
| AT&T Voice Mail with Pager | 08 |
| AT&T Pager | 09 |
| Spouse | 10 |
| Roommate | 11 |
| Children | 12 |
| Neighbor | 13 |
| Mother | 14 |
| Father | 15 |

TABLE 1-continued

| Tag | Identifier |
| --- | --- |
| Parents | 16 |

Table 2 shows an exemplary table in which identifiers are associated with telephone numbers for a particular PCS subscriber having a unique personal telephone number. In one exemplary embodiment, the telephone numbers are stored in data base 133 as elements of an array, one array for each subscriber, and the identifiers are the corresponding indices into the array. The array may be stored in a compressed form.

TABLE 2

| Identifier | Telephone # |
| --- | --- |
| 01 | 5559742211 |
| 02 | 5559497777 |
| 03 | 5559492211 |
| 04 | 5554152219 |
| 05 | |
| 06 | |
| 07 | 8005558100 |
| 08 | 8005554444 |
| 09 | 8005552312 |
| 10 | |
| 11 | |
| 12 | 2213861599 |
| 13 | |
| 14 | 8334429181 |
| 15 | |
| 16 | |

The stored associations between tags and telephone numbers are used to create a sequence of locations to which the calls to a subscriber's personal telephone number should be routed. Again, such a sequence of destinations is known as "quick sequence". Each of a subscriber's quick sequences has a quick sequence number which is a unique numerical designation.

Table 3 shows an exemplary set of quick sequences, QS1 to QS9, each having at most 3 possible telephone numbers to which they can attempt to route a call. Each telephone number is represented by the identifier (ID) corresponding to a tag which has been associated with that telephone number. Of course, in other embodiments of the invention, other quick sequences can have more than at most 3 possible telephone numbers. Also, as shown in table 3, each quick sequence need not have the same number of telephone numbers indicated therein.

TABLE 3

| | Quick Sequence Routings | | |
| --- | --- | --- | --- |
| Routing | ID 1 | ID 2 | ID 3 |
| QS1 | 02 | 01 | 04 |
| QS2 | 01 | | |
| QS3 | 01 | 02 | 03 |
| QS4 | 14 | 04 | 12 |
| QS5 | 04 | 02 | 01 |
| QS6 | 02 | 03 | |
| QS7 | | | |
| QS8 | 04 | 02 | |
| QS9 | | | |

Although not critical, understanding of the invention will be helped by first considering an example of the administration of a quick sequence. The example, which is divided into two separate listings, listing 1 and listing 2, shows how the tags are used to define a sequence of locations to which calls to a subscriber's personal telephone number should be routed at a particular time.

Each of the listings shows an exemplary pan of the interactions between a hypothetical subscriber and an automated attendant system that facilitates the administration of personal telephone numbers. Listing 1 shows the defining of a quick sequence. Listing 2 shows the designating of the quick sequence defined in listing 1 as the sequence that is to currently be used, thereby "activating" the quick sequence.

The listings show that portion of the interaction after a) the hypothetical subscriber places a call to an 800-type telephone number to connect to application adjunct 131 attendant, b) he has successfully completed any required login procedures to begin administering his personal telephone number, and c) the tags, telephone numbers and identifiers have been associated together. In each of the listings, boldface type shows that which the automated attendant says to the hypothetical subscriber. The actions taken by the caller are described in plain type. Explanatory comments as to the results caused by the subscriber's actions are shown in parenthesis. Also, in this example, the identifier corresponding to each tag is a one digit number.

---

Listing 1 - Storing tags in a quick sequence

To manage your call screening PINs, press 1.
To manage your tags, press 2.
To manage your quick sequences, press 3.
subscriber presses 3.
To add a quick sequence, press 1.
To delete a quick sequence, press 2.
To hear your quick sequences, press 3.
subscriber presses 1.
Enter the quick sequence number. Please enter a number from one to nine.
subscriber presses 1. (the quick sequence will be stored as quick sequence number 1).
Where is the first place calls should be delivered.
(the following listed items are those tags that have a phone number associated with them. Tags without a phone number are not listed).
Home, press 1.
Office, press 2.
Car Phone, press 4.
Neighbor, press 13.
Mother, press 14.
Brother, press 20.
Summer Home, press 33.
subscriber presses 4. (Car Phone becomes the first destination in the quick sequence)
You have selected car phone as the first place calls should be delivered.
Where is the second place calls should be delivered.
Press # to end this sequence.
Home, press 1.
Office, press 2.
Car Phone, press 4.
Neighbor, press 13.
Mother, press 14.
Brother, press 20.
Summer Home, press 33.
subscriber presses 2. (Office becomes the second destination in the quick sequence)
You have selected office as the second place calls should be delivered.
Where is the third place calls should be delivered.
Press # to end this sequence.
subscriber presses #. (Ends the quick sequence)
Quick sequence 1 is car phone and then office.
To approve this quick sequence press 1.
To approve this quick sequence and add another press 2.
To redo this quick sequence press 3.
**To quit what you are doing and return to the main menu press \*R.**
subscriber presses 1. (returns to the main menu)

Listing 2 - Activating a quick sequence

To get voice mail, press 1
To turn a quick sequence or quick follow me destination on or off, press 2.
To change your call delivery schedules, press 3.
To administer your lists and system settings, press 4.
To hear where your calls are going, press 5.
To get help, press *H.
subscriber presses 2.
Enter the quick sequence number or enter 0 to hear your list of quick sequences. To use quick follow me press #.
subscriber presses 1.
Starting immediately your calls will be delivered to car phone and then to office. This quick sequence will stay in effect until you turn it off.
To accept this quick sequence, press 1. Otherwise press 0.
subscriber presses 1.
Thank you.

Returning attention to FIG. 2, shown is a flowchart of an exemplary process for providing personal telecommunication services in accordance with the principles of the invention. The process is entered in step 201 when IXC switch 105 recognizes that the call is being placed to a personal telephone number. This is possible because personal telephone numbers have certain unique characteristics that allow them to be differentiated from conventional telephone numbers. For example, they may have a unique area code, and, within that area code, they may be further divided by unique exchange numbers that indicate the interexchange carrier (IXC) that will carry calls directed to the number. Prior to step 201, but part of the overall process of completing a PCS call, when a call is placed to a personal telephone number, e.g., by a calling party originating a call at a telephone station 101 (FIG. 1), a switch of local exchange carrier (LEC) 103 receives the dialed digits and, from their unique characteristics, recognizes that the call is an IXC personal communications type of call. Local exchange carrier (LEC) 103 then routes the call over a trunk, e.g., trunk 104, to switch 105 of an interexchange carrier for further handling as per the process shown in FIG. 2.

In step 203, IXC switch 105 queries application adjunct 131, via directory services network interface 115 and communications interface 137, as to where to route the call. The query includes a) an indication of the personal telephone number to which the call was placed and b) the ANI of the calling telephone, in accordance with an aspect of the invention. Application adjunct 131 determines the currently active quick sequence, according to which calls to the personal telephone number should presently be routed, in step 205. Control then passes to step 207, in which application adjunct 131 retrieves the first identifier of the currently active quick sequence. Next, in step 209, application adjunct 131 translates the identifier to its associated telephone number.

Thereafter, in accordance with the principles of the invention, conditional branch point 211 tests to determine if the translated telephone number is the same as the received ANI. If the test result in step 211 is NO, control passes to step 213, in which application adjunct 131 supplies the telephone number to IXC switch 105. IXC switch 105 routes the call to the telephone number it receives from application adjunct 131, in step 215. This results in the caller hearing the appropriate feedback tones, e.g., ringing or busy, depending on the status of the telephone line to which the call is routed and whether or not that telephone line is provisioned with the call waiting feature.

Next, conditional branch point 217 tests to determine if the call, as routed by IXC switch 105, has been a) completed or b) abandoned by the caller. If the test result in step 217 is YES, the process is exited in step 225. If the test result in step 217 is NO, indicating the call continues to exist, control passes to step 219, which tests to determine if a) the destination indicated by the supplied telephone number is busy or b) if the predetermined period for which the call should be routed to the supplied telephone number has expired. If the test result in step 219 is NO, control passes back to step 217. If the test result in step 219 is YES, control passes to conditional branch point 221, which tests to determine if there remains in the quick sequence any identifiers that have not yet been processed.

If the test result in step 221 is NO, indicating there are no remaining untried identifiers, control passes to step 225 and the process is exited. If the test result in step 221 is YES, control passes to step 223, in which application adjunct 131 retrieves the next untried identifier. Control then passes back to step 209 and the process continues as described above.

In accordance with the principles of the invention, if the test result in step 211 is YES, indicating that the translated telephone number, i.e., the telephone number to which the call will be routed next, is the same as the ANI of the calling telephone, control passes directly to step 223 to obtain the next untried identifier. Thus, advantageously, no attempt is made to route the PCS call back to the telephone from which it was originated.

In another embodiment of the invention, all the telephone numbers of the quick sequence are examined prior to any of them being supplied to IXC switch 105. If any of the telephone numbers are found to match one of the calling telephone, such a telephone number is temporarily blanked. Such blanking may be achieved by setting a special blanking field associated with the telephone number.

In other embodiments of the invention, telephone numbers and/or ANI may be replaced with other indications that represent the destination to which a call is to be routed or from which a call originated.

The foregoing merely illustrates the principles of the invention. It will thus be appreciated that those skilled in the an will be able to devise various arrangements which, although not explicitly described or shown herein, embody the principles of the invention and are thus within its spirit and scope.

I claim:

1. A method for use in a telephone system having a plurality of destinations to which a personal communication service (PCS) call may be routed, said telephone system attempting to complete a PCS call placed from a calling telephone to a subscriber's personal telephone number by routing said call, until said call is answered or abandoned, to each destination indicated in a predetermined sequence of destinations, the method comprising the steps of:

comparing the originating station identification information of the calling telephone with destinations of said sequence; and skipping over any destination of said sequence that is the same as the originating station identification information of the calling telephone so that no attempt is made to complete said PCS call to the calling telephone.

2. The invention as defined in claim 1 wherein said originating station identification information and said destinations are indicated by telephone numbers.

3. The invention as defined in claim 1 wherein said originating station identification information is the automatic numbering identification for the calling telephone.

4. A method for use in a telephone system having a plurality of destinations to which a personal communication service (PCS) call may be routed, said telephone system attempting to complete a PCS call placed from a calling telephone to a subscriber's personal telephone number by routing said call, until said call is answered or abandoned, to each destination indicated in a predetermined sequence of destinations, the improvement characterized by:
   routing said PCS call to any destination of said sequence when its turn occurs only if said destination indicates a telephone that is not the same as the telephone indicated by the originating station identification information of the calling telephone.

5. A method for use in a telephone system having a plurality of destinations to which a personal communication service (PCS) call may be routed, said telephone system attempting to complete a PCS call placed from a calling telephone to a subscriber's personal telephone number by routing said call, until said call is answered or abandoned, to each destination indicated in a predetermined sequence of destinations, the improvement characterized by:
   skipping over any destination of said sequence when its turn occurs and proceeding to the next destination in the sequence if said destination is the calling telephone.

6. A method for use in a telephone system having a plurality of telephone lines each having a telephone number, in which said telephone system attempts to complete a telephone call placed from a calling telephone to a subscriber's personal telephone number by routing said call, until said call is answered or abandoned, to each telephone line represented by a telephone number indicated in a predetermined sequence of telephone numbers, the method comprising the steps of:
   comparing the automatic numbering identification of the calling telephone with the next telephone number indicated in said sequence to which said call has not yet been routed; and,
   skipping over said next indicated telephone number to the telephone number indicated in said sequence that follows said next indicated telephone number if said next indicated telephone number and said automatic numbering identification of the calling telephone are the same.

7. A method for use in a telephone system having a plurality of telephone lines each having a telephone number, in which said telephone system attempts to complete a telephone call placed from a calling telephone to a subscriber's personal telephone number by routing said call, until said call is answered or abandoned, to each telephone line represented by a telephone number indicated in a predetermined sequence of telephone numbers, the method comprising the steps of:
   determining if the telephone number of the calling telephone is the same as any telephone number indicated in said sequence; and
   temporarily blanking said telephone number in said sequence for the duration of said call.

8. A method for use in a telephone system having a plurality of telephone lines each having a telephone number, in which said telephone system attempts to complete a telephone call placed from a calling telephone to a subscriber's personal telephone number by routing said call, until said call is answered or abandoned, to each telephone line represented by a telephone number indicated in a predetermined sequence of telephone numbers, the method comprising the steps of:
   comparing the automatic numbering identification of the calling telephone with the next telephone number indicated in said sequence to which said call has not yet been routed; and
   disregarding said next indicated telephone number if said next indicated telephone number and said automatic numbering identification of the calling telephone are the same.

9. A method for use in a telephone system having a plurality of telephone lines each having a telephone number, in which said telephone system attempts to complete a telephone call placed from a calling telephone to a subscriber's personal telephone number by routing said call, until said call is answered or abandoned, to each telephone line represented by a telephone number indicated in a predetermined sequence of telephone numbers, the method comprising the steps of:
   comparing the automatic numbering identification of the calling telephone with the next telephone number indicated in said sequence to which said call has not yet been routed; and
   routing said call to said next indicated telephone number only if said next indicated telephone number and said automatic numbering identification of the calling telephone are not the same.

10. A method for processing a telephone call for which there is stored a sequence of destination indicators for use in routing said call, the method comprising the steps of:
    retrieving at least one destination indicator of said sequence;
    comparing the originating station identification of said call to said at least one of said destination indicators of said sequence; and
    routing said call to each destination indicated in said sequence that is not the same destination as that indicated by said originating station identification, said routing in sequence continuing until said call is completed or abandoned.

11. A method for processing a telephone call for which there is stored a sequence of telephone numbers for use in routing said call, the method comprising the steps of:
    retrieving at least one telephone number of said sequence;
    comparing the ANI of said call to said at least one of said telephone numbers of said sequence; and
    routing said call to each telephone number of said sequence that is not equal to said ANI, said routing in sequence continuing until said call is completed or abandoned.

12. A method for processing a telephone call comprising the steps of:
    a. retrieving the next untried destination in a sequence of destinations to which said call is to be routed;
    b. comparing said retrieved destination for identity with the calling telephone;
    c. skipping over said retrieved destination if it is identical to the calling telephone; and d. attempting to complete said call to said retrieved destination if it is not identical to the calling telephone.

13. The invention as defined in claim 12 further including the step of:

repeating steps (a) through (d) until it said call is completed or abandoned.

14. A method for processing a personal communication service (PCS) call comprising the steps of:

a. retrieving the next untried telephone number in a sequence of telephone numbers to which said PCS call is to be routed;

b. comparing said retrieved telephone number for identity with the telephone number of the calling telephone;

c. skipping over said retrieved telephone number if it is identical to the telephone number of the calling telephone; and d. attempting to complete said call to said retrieved telephone number if it is not identical to the telephone number of the calling telephone.

15. The invention as defined in claim 14 further including the step of:

repeating steps (a) through (d) until it said PCS call is completed or abandoned.

* * * * *